(12) United States Patent
Wong et al.

(10) Patent No.: US 8,203,620 B2
(45) Date of Patent: Jun. 19, 2012

(54) METHOD AND APPARATUS FOR SHARPENING DIGITAL IMAGES

(75) Inventors: Ping Wah Wong, Sunnyvale, CA (US); Hong Chen, San Jose, CA (US)

(73) Assignee: Nethra Imaging Inc, Santa Clara, CA (US)

( * ) Notice: Subject to any disclaimer, the term of this patent is extended or adjusted under 35 U.S.C. 154(b) by 241 days.

(21) Appl. No.: 12/769,153

(22) Filed: Apr. 28, 2010

(65) Prior Publication Data

US 2011/0267484 A1    Nov. 3, 2011

(51) Int. Cl.
*H04N 5/228* (2006.01)

(52) U.S. Cl. ............ 348/222.1; 348/242; 348/252; 382/266

(58) Field of Classification Search ........ 348/222.1, 348/229.1, 252, 263, 606, 607, 625, 241–248; 382/266–269; 358/3.27
See application file for complete search history.

(56) References Cited

U.S. PATENT DOCUMENTS

| | | | |
|---|---|---|---|
| 6,628,329 B1 * | 9/2003 | Kelly et al. | 348/252 |
| 7,379,626 B2 * | 5/2008 | Lachine et al. | 382/300 |
| 7,872,678 B2 * | 1/2011 | Fuchs et al. | 348/246 |
| 2009/0096889 A1 * | 4/2009 | Tsuruoka | 348/222.1 |
| 2009/0316049 A1 * | 12/2009 | Fuji | 348/625 |
| 2010/0040302 A1 * | 2/2010 | Su et al. | 382/261 |
| 2010/0245632 A1 * | 9/2010 | Suzuki | 348/241 |
| 2011/0205402 A1 * | 8/2011 | Kumar et al. | 348/240.3 |

* cited by examiner

*Primary Examiner* — Tuan Ho
*Assistant Examiner* — Kent Wang
(74) *Attorney, Agent, or Firm* — Hahn Moodley LLP; Vani Moodley, Esq.

(57) ABSTRACT

Disclosed is a method for sharpening a digital image captured by a digital imaging device, the method comprising, for each pixel $X_{m,n}$ of the digital image: a) at an edge detector determining an edge parameter E, the edge parameter E providing an indication of whether the pixel $X_{m,n}$ is at an edge of the digital image; b) at a noose detector determining a noise parameter $\sigma$, the noise parameter $\sigma$ providing an indication of whether the pixel $X_{m,n}$ is a noise in the digital image; c) at a scaling module determining a scaling factor $\alpha_{m,n}$ based on a combination of the edge parameter E and the noise parameter $\sigma$; and d) at an image sharpening module applying the scaling factor $\alpha_{m,n}$ on a pixel by pixel basis to sharpen the digital image to get a sharpened pixel $Y_{m,n}$.

20 Claims, 4 Drawing Sheets

METHOD AND APPARATUS FOR SHARPENING DIGITAL IMAGES

TECHNICAL FIELD OF THE DISCLOSURE

The present disclosure generally relates to digital images, and more particularly to sharpening of digital images.

BACKGROUND OF THE DISCLOSURE

A digital image capturing system, such as a digital camera, is well known for recording either motion or still images. The digital image capturing system may be used to capture raw image data from an image sensor through a lens system, and subsequently processes the raw image data into output images using a digital image pipeline as shown in FIG. 1. Image sharpness is an important criterion on subjective quality of the output images because human observers often prefer images with crisp edges and nicely rendered details. The raw image data may not have a desired level of sharpness due to a variety of factors including but not limited to a quality of optics, focus setting, camera shake, object motion, and so on. Furthermore, in the digital image pipeline as shown in FIG. 1, some image processing algorithms such as demosaicing, noise filtering, and scaling can make the output images more blurry than the raw image data. As a result, an image sharpening algorithm is usually used in the digital image pipeline to increase the sharpness of the output images.

Many image sharpening algorithms are known in the art. Popular ones include unsharp masking, high pass filtering, and the like. Generally it is possible to perform image sharpening either in a Red Green Blue (RGB) domain or in a luminance-chrominance domain such as a YUV.

Pixels in a digital image may be arranged in rows and columns. Consider an input image pixel where $X_{m,n}$ denotes a value of a pixel at an mth row and nth column. The input image may be fed into the image sensor as shown in FIG. 1. An unsharp masking method, known in the art, may be used for image sharpening and may generate an output image pixel $Y_{m,n}$ using the following equation:

$$Y_{m,n} = X_{m,n} + \alpha(X_{m,n} - S_{m,n}) \quad (1)$$

where $S_{m,n}$ is a smoothed version of $X_{m,n}$, and $\alpha$ is a scaling factor. The smoothed value $S_{m,n}$ is often generated by processing $X_{m,n}$ with a low pass filter. Typical low pass filters used in image processing for this purpose can have a kernel of size 3×3, 3×5, 5×5, and the like. The scaling factor controls the sharpness of the output image. Generally, a larger value of $\alpha$ results in a sharper output image. One common characteristic of image sharpening algorithms is that they always enhance high frequency content of the images. Although this makes the output images sharper, it also amplifies the noise content of the images.

SUMMARY OF THE DISCLOSURE

In view of the foregoing disadvantages inherent in the prior art, the general purpose of the present disclosure is to provide a method and apparatus for sharpening digital images to include all advantages of the prior art, and to overcome the drawbacks inherent therein.

It is therefore an object of the present disclosure to provide a method and apparatus for increasing the sharpness of digital images without increasing the noise in the digital images.

To achieve the above objects, in one aspect, the present disclosure provides a method for sharpening a digital image captured by a digital imaging device, the method comprising, for each pixel $X_{m,n}$ of the digital image: a) at an edge detector determining an edge parameter E, the edge parameter E providing an indication of whether the pixel $X_{m,n}$ is at an edge of the digital image; b) at a noise detector determining a noise parameter $\sigma$, the noise parameter $\sigma$ providing an indication of whether the pixel $X_{m,n}$ represents noise in the digital image; c) at a scaling module determining a scaling factor $\alpha_{m,n}$ based on a combination of the edge parameter E and the noise parameter $\sigma$; and d) at an image sharpening module applying the scaling factor $\alpha_{m,n}$ on a pixel by pixel basis to sharpen the digital image to get a sharpened pixel $Y_{m,n}$.

In another aspect, the present disclosure provides an image processor for sharpening a digital image captured by a image processing system, the image processor comprising: for each pixel $X_{m,n}$ of the digital image: a) an edge detector capable of determining an edge parameter E, the edge parameter E provides an indication of whether the pixel $X_{m,n}$ is at an edge of the digital image; b) a noise detector capable of determining a noise parameter $\sigma$, the noise parameter $\sigma$ provides an indication of whether the pixel $X_{m,n}$ represents noise in the digital image; c) a scaling module coupled to the edge detector and to the noise detector, the scaling module capable of determining a scaling factor $\alpha_{m,n}$ based on a combination of the edge parameter E and the noise parameter $\sigma$; and d) an image sharpening module coupled to the scaling module, the image sharpening module capable of utilizing the scaling factor $\alpha_{m,n}$ on a pixel by pixel basis to sharpen the digital image to get a sharpened pixel $Y_{m,n}$.

In yet another aspect of the present disclosure, the present disclosure provides computer-implemented methods, computer systems and a computer readable medium containing a computer program product for sharpening a digital image captured by a digital imaging device, the computer program product comprising: for each pixel $X_{m,n}$ of the digital image: a) program code for determining an edge parameter E, the edge parameter E providing an indication of whether the pixel $X_{m,n}$ is at an edge of the digital image; b) program code for determining a noise parameter $\sigma$, the noise parameter $\sigma$ providing an indication of whether the pixel $X_{m,n}$ represents noise in the digital image; c) program code for determining a scaling factor $\alpha_{m,n}$ based on a combination of the edge parameter E and the noise parameter $\sigma$; and d) program code for applying the scaling factor $\alpha_{m,n}$ on a pixel by pixel basis to sharpen the digital image to get a sharpened pixel $Y_{m,n}$.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
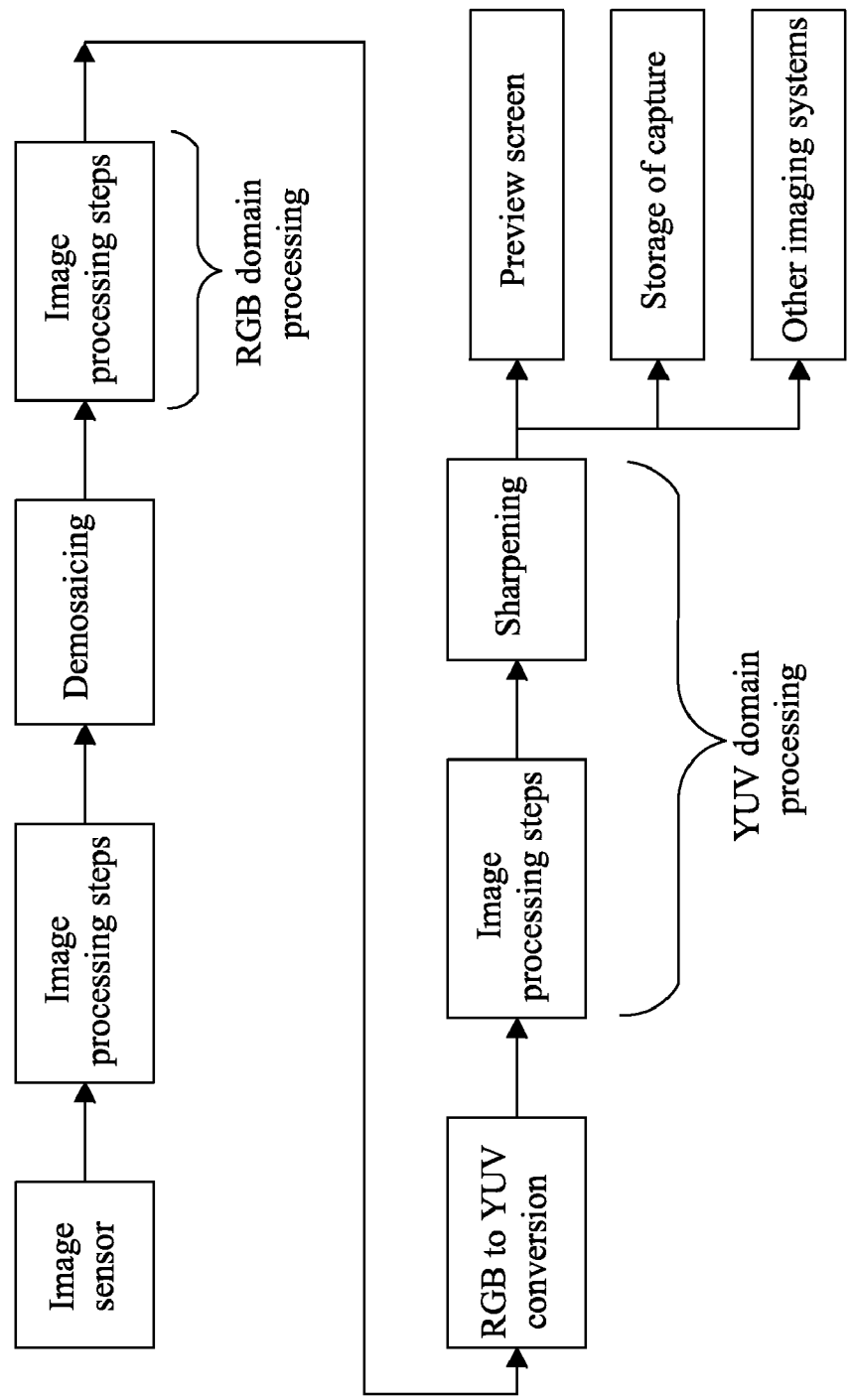
FIG. 1 is a block diagram of a prior art showing processing of a digital image in a conventional digital image pipeline.

The method and apparatus have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before describing in detail embodiments that are in accordance with the present disclosure, it should be observed that the embodiments reside primarily in combinations of method steps and system components related to sharpening a digital image without amplifying a noise level in the digital image.

In this document, relational terms such as first and second, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements that does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Any embodiment described herein is not necessarily to be construed as preferred or advantageous over other embodiments. All of the embodiments described in this detailed description are illustrative, and provided to enable persons skilled in the art to make or use the disclosure and not to limit the scope of the disclosure, which is defined by the claims.

The present disclosure provides a method and system for increasing the sharpness of digital images without or at least minimally amplifying a noise level in the digital images. Specifically, a digital image is processed or sharpened by the system pixel by pixel, as will be explained in conjunction with FIGS. 2, 3, and 4.

Figure 2:
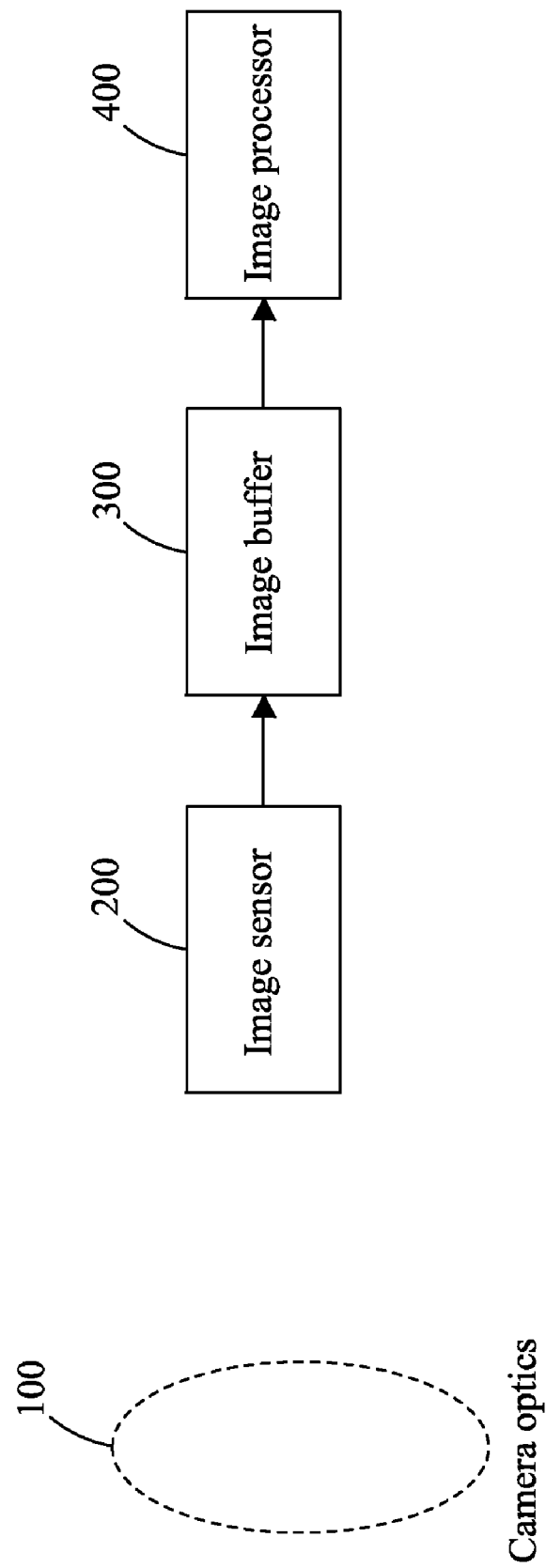
FIG. 2 shows a schematic block diagram of an image processing system, in accordance with an embodiment of the invention.
Figure 3:
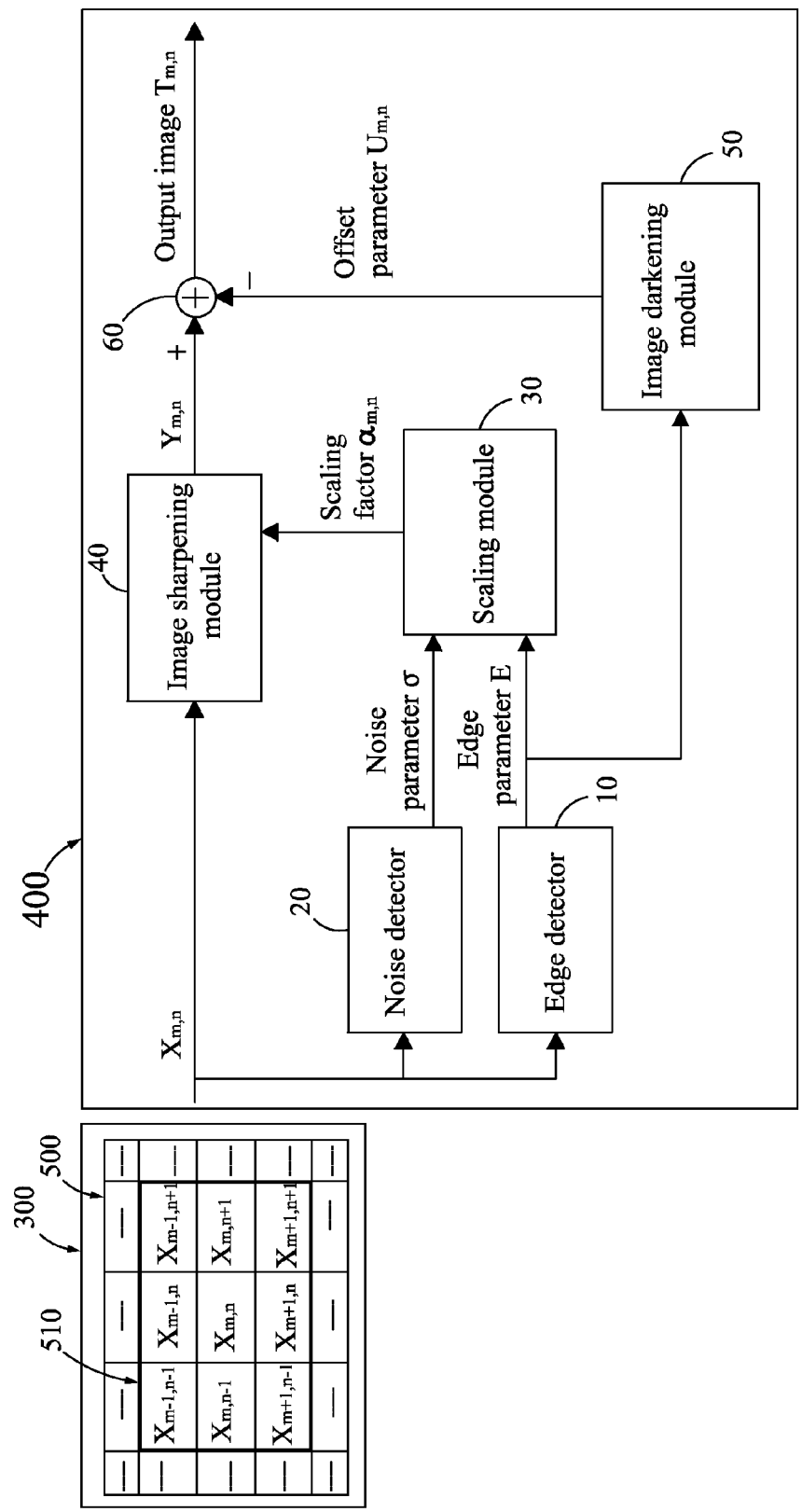
FIG. 3 is a block diagram of an image buffer and an image processor used by the image processing system for sharpening a digital image, in accordance with an embodiment of the present disclosure.

Referring to FIG. 2, a block diagram of an image processing system is shown, in accordance with an embodiment of the present disclosure. The image processing system comprises camera optics 100, an image sensor 200, an image buffer 300, and an image processor 400. The camera optics 100 and the image sensor 200 may enable the system to capture a digital image 500 (as is shown in FIG. 3). The digital image 500 may be stored in the image buffer 300 which is coupled to the image processor 400. Further, the digital image 500 may be read by the image processor 400 from the image buffer 300 for further processing and sharpening of the digital image 500. In one embodiment, the system may be in the form of a digital camera, in which case it may include other components dictated by the function of the digital camera such camera optics 100.

Referring to now FIG. 3, a more detailed block diagram of the image buffer 300 and the image processor 400 is shown, in accordance with an embodiment of the present disclosure. The image buffer 300 is a memory device which may be used by the image processor 400 for extracting digital image 500 for sharpening and processing.

The image buffer 300 may store the digital image 500 as shown in the FIG. 3. The digital image 500 may comprise millions of pixels depending on the resolution of the image sensor 200. For the sake of brevity of this description, a 3×3 pixel matrix 510 of the digital image 500 is used for explaining the various embodiments of the present invention. Specifically, the 3×3 pixel matrix 510 has three columns and three rows having nine pixels in totality.

The image processor 400 includes an edge detector 10, a noise detector 20, a scaling module 30, an image sharpening module 40, an image darkening module 50, and an adder 60. The image processor 400 may read the digital image 500 in the form of blocks of pixels in order to sharpen the digital image 500. Specifically, a block of pixels may be read by the edge detector 10 from the image buffer 300. The edge detector 10 executes an edge detection algorithm to determine whether a pixel $X_{m,n}$ is at an edge. Specifically, the edge detector 10 is capable of determining an edge parameter E of the pixel $X_{m,n}$ of the digital image 500. The edge parameter E provides an indication of whether the pixel $X_{m,n}$ is at an edge in the image. Further, the edge parameter E may determine whether the pixel $X_{m,n}$ is on a dark side of the edge or on a light side of the edge. In embodiment of the present disclosure, a Sobel type edge detector may be used as the edge detection algorithm. However, it will be evident to a person skilled in the art that any other type of edge detector may be used without deviating from the scope of present disclosure.

In the present embodiment, the blocks of pixels may also be read by the noise detector 20 from the image buffer 300. The noise detector 20 is capable of determining a noise parameter σ which provides an indication of whether the pixel $X_{m,n}$ represents noise in the digital image 500. Specifically, the noise parameter σ may compare the pixel $X_{m,n}$ with a neighborhood R of pixels centered on the pixel $X_{m,n}$. In one embodiment, a 3×3 neighborhood R of pixels centered at $X_{m,n}$ may be considered. The 3×3 neighborhood R of pixels defines an 8-pixel neighborhood comprising the pixel set $\{X_{m-1,n-1}, X_{m-1,n}, X_{m-1,n+1}, X_{m,n-1}, X_{m,n+1}, X_{m+1,n-1}, X_{m+1,n}, X_{m+1,n+1}\}$.

The pixels in the neighborhood R are examined to determine the maximum value and minimum pixel values in the neighborhood R as follows:

$$A_{m,n} = \max_{R_{m,n}} X_{m,n} \qquad (2)$$

$$B_{m,n} = \min_{R_{m,n}} X_{m,n} \qquad (3)$$

In one embodiment, if the pixel $X_{m,n}$ is either larger than $A_{m,n}$ or lower than $B_{m,n}$, then the pixel $X_{m,n}$ is considered to be a high level noise. Further, when the difference between $A_{m,n}$ and $B_{m,n}$ is large or when pixel $X_{m,n}$ is close to either $A_{m,n}$ or $B_{m,n}$ pixel Xm,n would be considered to be a medium level noise.

In one embodiment of the present disclosure, the edge parameter E and the noise parameter σ may be fed to the scaling module 30 for calculation of a scaling factor $\alpha_{m,n}$. Specifically, the edge detector 10 and the noise detector 20 are coupled to the scaling module 30 which is capable of determining the scaling factor $\alpha_{m,n}$ based on a combination of the edge parameter E and the noise parameter σ. The scaling factor $\alpha_{m,n}$ is used to sharpen the digital image 500. In a one embodiment, the scaling module 30 controls the value of the scaling factor $\alpha_{m,n}$ for every pixel location by combining the results of edge parameter E and noise parameter σ. An objective of the combining the results of edge parameter E and noise parameter σ for calculating the scaling factor $\alpha_{m,n}$ is to avoid sharpening at either non-edge pixels or noise pixels.

In one embodiment of the present disclosure, when the pixel $X_{m,n}$ is considered to be a high level noise, the scaling factor will be set to zero and there will be no sharpening. Similarly, when the pixel $X_{m,n}$ is considered to be a medium level noise, the scaling factor will be reduced thereby reducing the sharpening level. In other words, the scaling factor $\alpha_{m,n}$ may be discarded when the value of the pixel $X_{m,n}$ is outside a range defined by the neighborhood pixels.

In one embodiment of the present disclosure, the scaling factor $\alpha_{m,n}$ may be fed to the image sharpening module 40 which is coupled to the scaling module 30. The image sharpening module 40 is capable of utilizing the scaling factor $\alpha_{m,n}$ in as a parameter of an image sharpening algorithm for sharpening the pixel $X_{m,n}$ to get a sharpened pixel $Y_{m,n}$ in an output image. In one embodiment, the image sharpening module 40 implements an unsharp masking algorithm of the form $$Y_{m,n} = X_{m,n} + \alpha_{m,n}(X_{m,n} - S_{m,n}) \quad (4)$$

where the scaling factor $\alpha_{m,n}$ varies from pixel to pixel, and $Y_{m,n}$ is a pixel an output/sharpened image. In one embodiment, to perform edge controlled sharpening, the scaling factor $\alpha_{m,n}$ is set to zero for the pixel locations where an edge is not detected. Further, for edge pixel locations, scaling factor $\alpha_{m,n}$ is set to a non-zero value to perform edge sharpening.

In one embodiment of the present disclosure, the edge parameter E may be fed to the image darkening module 50 which is coupled to the edge detector 10. The image darkening module 50 is capable of determining an offset parameter $U_{m,n}$ when the pixel $X_{m,n}$ is determined to be on the dark side of the edge. When the pixel $X_{m,n}$ is determined to be on the dark side of the edge, the image darkening module 50 darkens the pixel $X_{m,n}$ in order to sharpen the pixel $X_{m,n}$ using the offset parameter $U_{m,n}$.

In an embodiment of the present disclosure, an adder may generate an output image pixel $T_{m,n}$ based on a combination of the sharpened pixel $Y_{m,n}$ and the offset parameter $U_{m,n}$ as shown in the following equation:

$$T_{m,n} = Y_{m,n} - U_{m,n} \quad (5)$$

Figure 4:
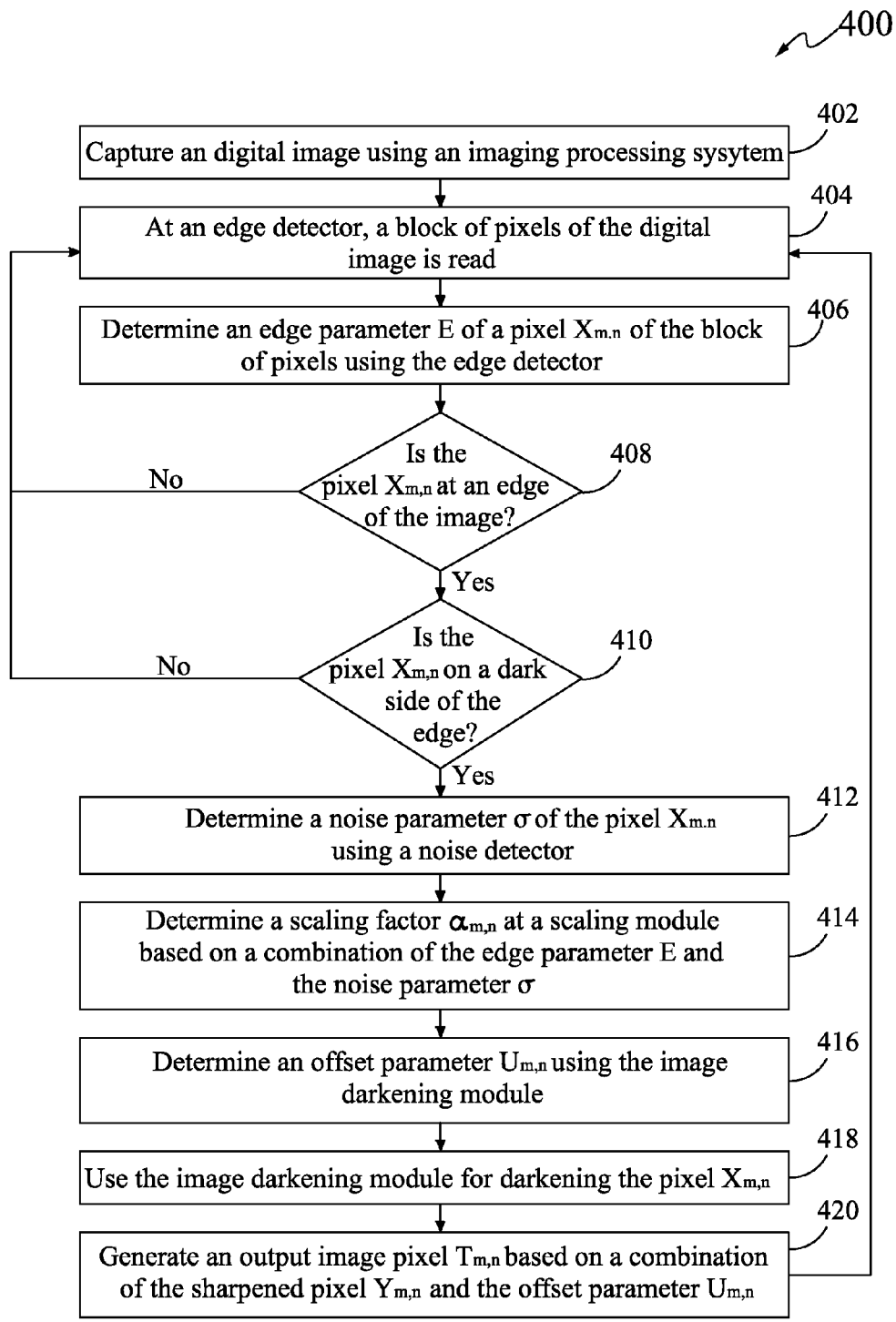
FIG. 4 is a flow chart representing a method for sharpening an image, in accordance with an embodiment of the present disclosure.

Referring now to FIG. 4, a flow chart representing a method for sharpening the digital image 500 is shown, in accordance with an embodiment of the present disclosure. The method starts at 402 where an image, such as the digital image 500, is captured using the image processing system described. At 404, a pixel $X_{m,n}$ of the digital image 500 is read by the edge detector 10. Further, at 406, the edge parameter E of the pixel $X_{m,n}$ is determined using the edge detector 10. At 408, it is determined whether the pixel $X_{m,n}$ is at an edge of the digital image 500. When the pixel $X_{m,n}$ is determined to be at the edge of the digital image 500, then at 410 it is determined whether the pixel $X_{m,n}$ is on a dark side of the edge. If yes, then the noise parameter $\sigma$ of the pixel $X_{m,n}$ is determined using the noise detector 20 at 412. At 414, the scaling factor $\alpha_{m,n}$ is determined at a scaling module 30 based on a combination of the edge parameter E and the noise parameter $\sigma$. At 416, the image darkening module 50 determines an offset parameter. At 418, the image darkening module 50 darkens in order to sharpen the pixel $X_{m,n}$ using the offset parameter $U_{m,n}$. At 420, the adder generates an output image pixel $T_{m,n}$ based on a combination of the sharpened pixel $Y_{m,n}$ and the offset parameter $U_{m,n}$.

It will be appreciated that embodiments of the disclosure described herein may comprise one or more conventional processors and unique stored program instructions that control the one or more processors to implement, in conjunction with certain non-processor circuits, some, most, or all functions of sharpening a digital image without amplifying a noise level in the digital image. Alternatively, some or all functions of sharpening a digital image could be implemented by a state machine that has not stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will be understood by those familiar with the art, the disclosure may be embodied in other specific forms without departing from the spirit or essential characteristics thereof. Likewise, the particular naming and division of the modules, agents, managers, functions, procedures, actions, methods, classes, objects, layers, features, attributes, methodologies and other aspects are not mandatory or significant, and the mechanisms that implement the disclosure or its features may have different names, divisions and/or formats. Furthermore, as will be apparent to one of ordinary skill in the relevant art, the modules, agents, managers, functions, procedures, actions, methods, classes, objects, layers, features, attributes, methodologies and other aspects of the disclosure can be implemented as software, hardware, firmware or any combination of the three. Of course, wherever a component of the present disclosure is implemented as software, the component can be implemented as a script, as a standalone program, as part of a larger program, as a plurality of separate scripts or programs, as a statically or dynamically linked library, as a kernel loadable module, as a device driver, and/or in every and any other way known now or in the future to those of skill in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the disclosure, which is set forth in the following claims.

We claim:

1. A method for sharpening a digital image captured by a digital imaging device, the method comprising:
for each pixel $X_{m,n}$ of the digital image:
at an edge detector determining an edge parameter E, the edge parameter E providing an indication of whether the pixel $X_{m,n}$ is at an edge of the digital image;
at a noise detector determining a noise parameter $\sigma$, the noise parameter $\sigma$ providing an indication of whether the pixel $X_{m,n}$ is a noise in the digital image;
at a scaling module determining a scaling factor $\alpha_{m,n}$ based on a combination of the edge parameter E and the noise parameter $\sigma$; and
at an image sharpening module applying the scaling factor $\alpha_{m,n}$ on a pixel by pixel basis to sharpen the digital image to get a sharpened pixel $Y_{m,n}$.

2. The method of claim 1, wherein determining the edge parameter E comprises determining whether the pixel $X_{m,n}$ is on a dark side of the edge or on a light side of the edge.

3. The method of claim 2, further comprising at an image darkening module determining an offset parameter $U_{m,n}$ when the pixel $X_{m,n}$ is determined to be on the dark side of the edge.

4. The method of claim 3, wherein the image darkening module darkens in order to sharpen the pixel $X_{m,n}$ using the offset parameter $U_{m,n}$.

5. The method of claim 3, further comprises at an adder generating an output image pixel $T_{m,n}$ based on a combination of the sharpened pixel $Y_{m,n}$ and the offset parameter $U_{m,n}$.

6. The method of claim 1, wherein the image sharpening module is an unsharp masking module.

7. The method of claim 6, further comprising discarding the scaling factor $\alpha_{m,n}$ when a value of the pixel $X_{m,n}$ is outside a range defined by the neighborhood pixels.

8. The method of claim 1, wherein determining the noise parameter $\sigma$ comprises comparing the pixel $X_{m,n}$ with neighborhood pixels centered on the pixel $X_{m,n}$.

9. An image processor for sharpening a digital image captured by a image processing system, the image processor comprising:
for each pixel $X_{m,n}$ of the digital image:
an edge detector capable of determining an edge parameter E, the edge parameter E provides an indication of whether the pixel $X_{m,n}$ is at an edge of the digital image;
a noise detector capable of determining a noise parameter $\sigma$, the noise parameter $\sigma$ provides an indication of whether the pixel $X_{m,n}$ is a noise in the digital image;
a scaling module coupled to the edge detector and to the noise detector, the scaling module capable of determining a scaling factor $\alpha_{m,n}$ based on a combination of the edge parameter E and the noise parameter $\sigma$; and
an image sharpening module coupled to the scaling module, the image sharpening module capable of utilizing the scaling factor $\alpha_{m,n}$ on a pixel by pixel basis to sharpen the digital image to get a sharpened pixel $Y_{m,n}$.

10. The image processor of claim 9, wherein the edge detector further determines whether the pixel $X_{m,n}$ is on a dark side of the edge or on a light side of the edge.

11. The image processor of claim 10, further comprising an image darkening module determining an offset parameter $U_{m,n}$ when the pixel $X_{m,n}$ is determined to be on the dark side of the edge.

12. The image processor of claim 11, further comprises an adder capable of generating an output image pixel $T_{m,n}$ based on a combination of the sharpened pixel $Y_{m,n}$ and the offset parameter $U_{m,n}$.

13. The image processor of claim 10, wherein the image darkening module darkens in order to sharpen the pixel $X_{m,n}$ using the offset parameter $U_{m,n}$.

14. The image processor of claim 9, wherein the image sharpening module is an unsharp masking module.

15. The image processor of claim 9, wherein determining the noise parameter $\sigma$ comprises comparing the pixel $X_{m,n}$ with neighborhood pixels centered on the pixel $X_{m,n}$.

16. A non-transitory computer readable medium containing a computer program product for sharpening a digital image captured by a digital imaging device, the computer program product comprising:
for each pixel $X_{m,n}$ of the digital image:
program code for determining an edge parameter E, the edge parameter E providing an indication of whether the pixel $X_{m,n}$ is at an edge of the digital image;
program code for determining a noise parameter $\sigma$, the noise parameter $\sigma$ providing an indication of whether the pixel $X_{m,n}$ is a noise in the digital image;
program code for determining a scaling factor $\alpha_{m,n}$ based on a combination of the edge parameter E and the noise parameter $\sigma$; and
program code for applying the scaling factor $\alpha_{m,n}$ on a pixel by pixel basis to sharpen the digital image to get a sharpened pixel $Y_{m,n}$.

17. The computer program product of claim 16, wherein determining the edge parameter E comprises determining whether the pixel $X_{m,n}$ is on a dark side of the edge or on a light side of the edge.

18. The computer program product of claim 17, further comprising program code for determining an offset parameter $U_{m,n}$ when the pixel $X_{m,n}$ is determined to be on the dark side of the edge.

19. The computer program product of claim 18, wherein the program code darkens in order to sharpen the pixel $X_{m,n}$ using the offset parameter $U_{m,n}$.

20. The computer program product of claim 18, further comprises program code for generating an output image pixel $T_{m,n}$ based on a combination of the sharpened pixel $Y_{m,n}$ and the offset parameter $U_{m,n}$.

* * * * *